US007483398B1

(12) United States Patent
Huai et al.

(10) Patent No.: US 7,483,398 B1
(45) Date of Patent: Jan. 27, 2009

(54) METHOD AND SYSTEM FOR DETECTING RING LINK PROVISIONING MISMATCH

(75) Inventors: Jin Huai, Petaluma, CA (US);
Wanq-Der Lee, Plano, TX (US);
Xiaopin Nie, Beijing (CN)

(73) Assignee: Cisco Technology, Inc., San Jose, CA (US)

( * ) Notice: Subject to any disclaimer, the term of this patent is extended or adjusted under 35 U.S.C. 154(b) by 1177 days.

(21) Appl. No.: 09/860,963

(22) Filed: May 18, 2001

(51) Int. Cl.
*H04L 12/28* (2006.01)

(52) U.S. Cl. .................. 370/258; 370/222; 370/242

(58) Field of Classification Search .......... 370/216, 370/222–253, 254–258, 389, 400, 403–406, 370/424, 453
See application file for complete search history.

(56) References Cited

U.S. PATENT DOCUMENTS

| 5,084,870 | A * | 1/1992 | Hutchison et al. | 370/258 |
|---|---|---|---|---|
| 6,414,941 | B1 * | 7/2002 | Murakami | 370/245 |
| 6,563,833 | B1 * | 5/2003 | Wool et al. | 370/404 |
| 6,621,818 | B1 * | 9/2003 | Szczepanek et al. | 370/389 |
| 6,654,341 | B1 * | 11/2003 | Chi et al. | 370/216 |
| 6,657,969 | B1 * | 12/2003 | Neuendorff et al. | 370/245 |
| 6,748,476 | B2 * | 6/2004 | Hagino | 710/305 |
| 6,751,189 | B1 * | 6/2004 | Gullicksen et al. | 370/216 |
| 2001/0015960 | A1 * | 8/2001 | Barker | 370/250 |
| 2004/0190461 | A1 * | 9/2004 | Gullicksen et al. | 370/258 |

OTHER PUBLICATIONS

RFC 2328 "OSPF Version 2" Ascend Communications, Inc., Apr. 1998, http://www.cls.ohio-state.edu/cgi-bin/rfc/rfc2328.html, 171 pages.
RFC 2370 "Internet RFC/STD/FYI/BCP Archives", http://www.landfield.com/rfcs/rfc2370.html, 11 pages.

* cited by examiner

*Primary Examiner*—Firmin Backer
*Assistant Examiner*—Jason Mattis
(74) *Attorney, Agent, or Firm*—Cindy Kaplan

(57) ABSTRACT

A method for automatically detecting bi-directional link switched ring link provisioning errors. The method includes receiving an opaque link state advertisement containing bi-directional link switched ring ID and link information at a local node of the ring and checking ring IDs of neighbor nodes of the local node. If the ring IDs of the local node and neighbor nodes do not match a ring ID mismatch alarm is raised.

20 Claims, 5 Drawing Sheets

METHOD AND SYSTEM FOR DETECTING RING LINK PROVISIONING MISMATCH

BACKGROUND OF THE INVENTION

The present invention relates generally to communications within a computer network, and more specifically, to the automatic detection of ring link provisioning errors within a communications network.

Communication in a computer network involves the exchange of data between two or more entities interconnected by communication links and subnetworks. Entities concerned primarily with the correct routing of information in the network are called routers, to distinguish them from end systems which process traffic but do not take part in routing it. There are two fundamentally different approaches to the distribution and use of routing information in a network, called Distance Vector Routing and Link State Routing. In the former, each router tells its immediate neighbors how it would reach each entity in the network, updating this as similar information is received from its neighbors. In the latter, each router arranges to send information about its own connectivity to its neighbors to all routers in the network. Each router then runs an algorithm called Shortest Path First (SPF) to find the best route from itself to each entity in the network. Early routing protocols (e.g., RIP) used the Distance Vector approach. Link State Routing protocols first appeared in the early 1980s, and became widely used in the Internet during the 1990s. OSPF (Open Shortest Path First) and Integrated IS-IS (Intermediate System—Intermediate System) are widely used examples of such protocols.

With link state routing, each router must discover its neighbors and learn their network addresses. A cost (typically related to the link bandwidth) is associated, generally by network management, with each link. One or more link state packets are then constructed containing this information, and flooded to all routers in the network. Dijkstra's Shortest Path First algorithm is then used at each router to find the shortest path to every other router. This algorithm maintains a set of nodes whose shortest path is already known and operates by adding one node to this known set with each iteration. The next step is to the next closest router along this path, always choosing the one which has the lowest cost from the local node. This process continues until all reachable nodes are in the known set with costs assigned to each.

SONET/SDH networks typically provide protection from failure by using topologies that dedicate half of the total bandwidth for protection. One type of SONET protection is bi-directional line switched ring (BLSR). The BLSR may be two-fiber or four-fiber. BLSR provides rapid restoration times with control logic. In a BLSR, traffic can be added and dropped at any node along a given ring. At the drop site, new traffic can be added to the previously used time slot and transported further around the ring. This re-use of bandwidth in a BLSR increases the capacity for the entire ring and provides many advantages over a unidirectional path switched ring (UPSR). If a fiber is cut in the BLSR, multiplexers have the speed to send the services affected via an alternate acceptable path through the ring without interruption.

When a BLSR is provisioned, each node in the BLSR has to know what other nodes are in the same ring. A user must manually check the ring provisioning to make sure the ring ID is the same from both links at a node within the ring. If there is a provisioning mismatch within the ring, the user may not know about it until route protection is utilized.

There is, therefore, a need for a method and system for automatically detecting link provisioning mismatch errors without user intervention.

SUMMARY OF THE INVENTION

A method for automatically detecting bi-directional link switched ring link provisioning errors is disclosed. The method generally comprises receiving an opaque link state advertisement containing bi-directional link switched ring ID and link information at a local node of the ring and checking a ring ID of neighbor nodes of the local node. If the ring IDs of the local node and neighbor nodes do not match a ring ID mismatch alarm is raised.

A system for automatically detecting bi-directional link switched ring link provisioning errors generally comprises a processor operable to receive an opaque link state advertisement containing bi-directional link switched ring ID and link information at a local node of the ring, check a ring ID of neighbor nodes of the local node, and raise a ring ID mismatch alarm if the ring ID of the local node or neighbor nodes do not match. The system further includes memory configured to at least temporarily store the link state advertisement.

A computer program product for automatically detecting bi-directional link switched ring link provisioning errors generally comprises computer code that receives an opaque link state advertisement containing bi-directional link switched ring ID and link information at a local node of the ring and checks a ring ID of neighbor nodes of the local node. The product further includes computer code that raises a ring ID mismatch alarm if the ring ID of the local node or neighbor nodes do not match and a computer readable medium that stores the computer codes.

The above is a brief description of some deficiencies in the prior art and advantages of the present invention. Other features, advantages, and embodiments of the invention will be apparent to those skilled in the art from the following description, drawings, and claims.

BRIEF DESCRIPTION OF THE DRAWINGS

Corresponding reference characters indicate corresponding parts throughout the several views of the drawings.

DETAILED DESCRIPTION OF THE INVENTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

Figure 1:
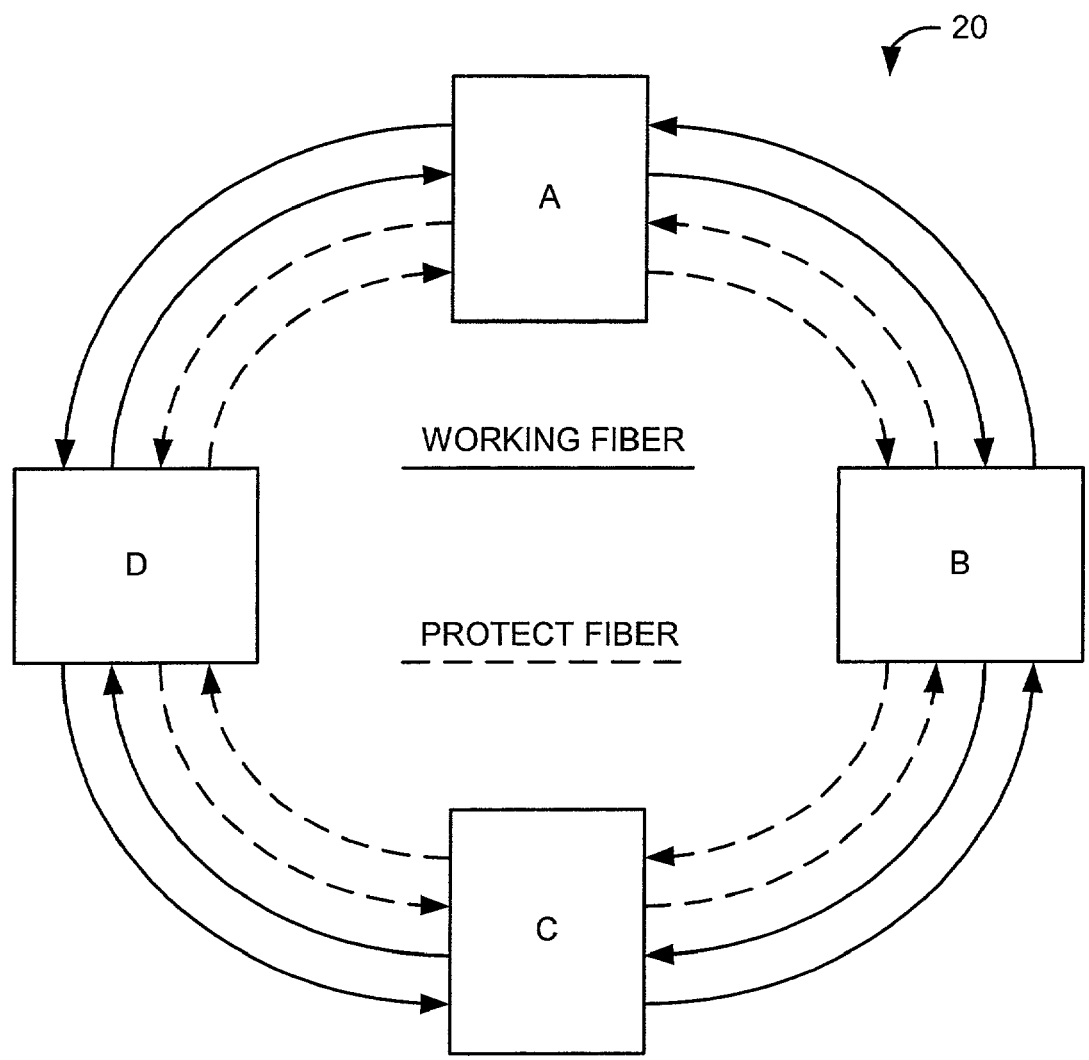
FIG. 1 is an example of a bi-directional line switched ring (BLSR).

Referring now to the drawings, and first to FIG. 1, a four-fiber BLSR SONET ring is shown, and generally indicated at 20. The BLSR contains four nodes A, B, C, D. The BLSR may be used, for example, in the backbone of a long haul network. The four fiber bi-directional line switching ring sends traffic only in the required direction during normal operation. The ring has a pair of working fibers (shown with solid lines) and a pair of protect fibers (shown with dashed lines). It is to be understood that the four-fiber BLSR is only provided as an example, and the present invention may be used with other configuration BLSRs such as a two-fiber BLSR.

The BLSR consists of multiple SONET nodes that connect into a ring topology. When a BLSR is provisioned, each node in the BLSR has to know what other nodes are in the same ring. To provision a BLSR, each node must be assigned with the same ring ID and a unique node ID. Each node also has to know the ring map (i.e., what other nodes are on the same ring and their node IDs and hop counts). When provisioning BLSR on a node, one link must be designated as the east link and the other link designated as a west link. In order for the BLSR to function properly, the east link of the node must be connected to the west link of its neighbor and they must have the same ring ID. The present invention provides a method and system to automatically detect any mismatch of the ring ID and east and west direction links.

The present invention operates in the context of a data communication network including multiple network elements. Some of the nodes in a network that employs the present invention may be network devices such as routers and switches. For example, some of the nodes may be suitably configured routers such as those available from Cisco Systems, Inc. of San Jose, Calif. As used herein the term router is used to refer to devices that forward packets based on network and higher layer information. The router may include, for example, a master central processing unit (CPU), interfaces, and a bus. The CPU preferably includes memory and a processor. When acting under the control of appropriate software or firmware, the CPU is responsible for such router tasks as routing table computations, network management, and general processing of packets. It preferably accomplishes all of these functions under the control of software including an operating system (e.g., a version of the Internetwork Operating System (IOS®) of Cisco Systems, Inc.) and any appropriate applications software. The CPU may include one or more processors such as a processor from the Motorola family or microprocessors of the MIPS family of microprocessors. In an alternative embodiment, the processor is specially designed hardware for controlling the operations of the router. Memory may be non-volatile RAM or ROM. However, there are many different ways in which memory may be coupled to the system. In an alternative embodiment, a router or switch may be implemented on a general purpose network host machine such as the computer system of FIG. 2.

Figure 2:
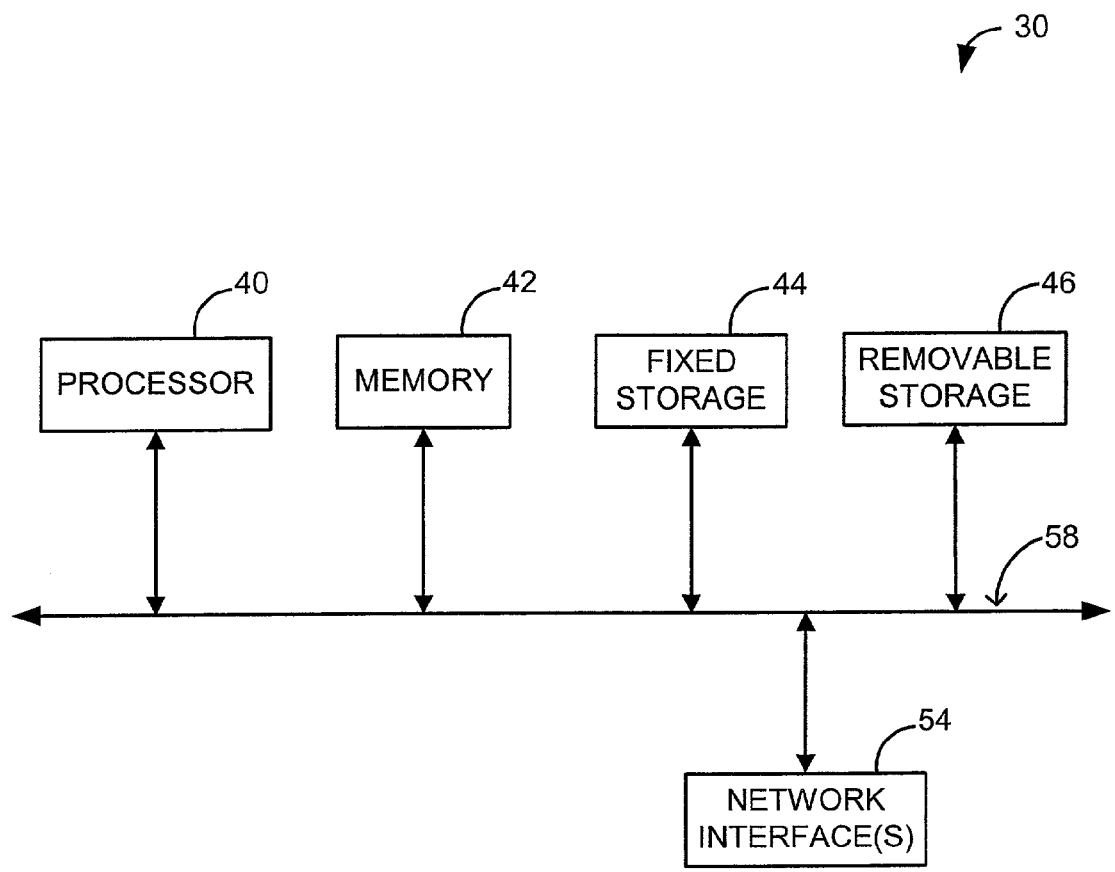
FIG. 2 is a block diagram illustrating an example of a computer system that can be utilized to execute software of an embodiment of the present invention.

FIG. 2 shows a system block diagram of computer system 30 that may be used to execute software of an embodiment of the invention. The computer system may include subsystems such as a central processor 40, system memory 42, removable storage 46 (e.g., CD-ROM drive), and a hard drive 44 which can be utilized to store and retrieve software programs incorporating computer code that implements aspects of the invention, data for use with the invention, and the like. The computer readable medium may also include floppy disk, zip disk, tape, flash memory, or system memory. Other computer systems suitable for use with the invention may include additional or fewer subsystems. For example, the computer system may include more than one processor 40 (i.e., a multiprocessor system) or a cache memory.

The system bus architecture of the computer system 30 is represented by arrows 58 in FIG. 2. However, these arrows are only illustrative of one possible interconnection scheme serving to link the subsystems. For example, a local bus may be utilized to connect the central processor 40 to the system memory 42. The components shown and described herein are those typically found in most general and special purpose computers and are intended to be representative of this broad category of data processors. The computer system 30 shown in FIG. 2 is only one example of a computer system suitable for use with the invention. Other computer architectures having different configurations of subsystems may also be utilized.

Communication between computers within the network is made possible with the use of communication protocols, which govern how computers exchange information over a network. The computer may include an input/output circuit used to communicate information in appropriately structured form to and from parts of the computer and associated equipment. Preferably, each of these interfaces includes a plurality of ports appropriate for communication with the appropriate media, and associated logic, and in some instances memory. The associated logic may control such communication intensive tasks as packet integrity checking and media control and management. The high speed interfaces are preferably multiport Ethernet interfaces, but may be other appropriate interfaces such as FDDI interfaces.

The routers facilitate the flow of data packets throughout the system by routing the packets to the proper receiving stations. The packet typically contains the address of the final destination station. The final destination address remains constant as the packet traverses the networks. A key function of the router is determining the next station to which the packet is sent. The routers typically execute routing algorithms to decide over which communication links incoming packets should be transmitted. A type of network layer routing protocol commonly employed by routers is a link state routing protocol. With link state routing, each router must discover its neighbors and learn their network addresses, measure the delay to each of its neighbors, construct a packet containing this information, send the packet to all other routers, and compute the shortest path to every other router.

When the router is booted, its first task is to learn who its neighbors are. It accomplishes this goal by sending a special HELLO packet on each point-to-point line. The router on the other end is expected to send back a reply telling who it is. Once the information needed for the exchange has been collected, the next step is for each router to build a packet containing all of this data. The packet (a Link State Packet) starts with the identity of the sender, followed by a sequence number, age, and a list of neighbors. For each neighbor, the cost to that neighbor, a network management parameter, is given. The link state database is synchronized by having the routers exchange LSPs to build the link state database. The routers flood the networks with LSPs, check integrity using a checksum, and resend the LSPs by forwarding them out on all enabled interfaces except the interface on which each was received or on which the same LSP has already been received. The router's link state database is thus a combination of the router's own adjacency database and the LSP, arriving from all other routers. When the link state database is complete, a copy of the database, which includes a map of the network and its links, services, and external routes for the area, is maintained in each router.

As discussed above, OSPF is a widely used protocol to carry link state information for IP routing purposes. OSPF is described in RFC 2328, OSPF Version 2, by J. Moy, dated April 1998, which is incorporated herein by reference in its entirety. Each router in the system maintains an identical link state database describing the system's topology. From this database, a routing table is calculated by constructing a shortest-path tree. The database includes a router's local state (e.g., the router's usable interfaces and reachable neighbors). The link state advertisement (LSA) is a unit of data describing the local state of a router or network. Each link state advertisement is flooded throughout the routing domain. The collected link state advertisements of all routers and networks forms the protocol's link state database. OSPF recalculates routes upon detection of a topology change, such as router interface failures.

Opaque LSA (Link State Advertisement) enhances the OSPF protocol so that it can carry extra link state information such as BLSR ring ID. Opaque LSAs include a standard LSA header followed by application-specific information. These application-specific information fields are used by OSPF. OSPF link-state database flooding mechanisms are used to distribute Opaque LSAs to all or a limited portion of the OSPF topology. Opaque LSA is described in RFC 2370, The OSPF Opaque LSA Option, by R. Coltun, dated July 1998, which is incorporated herein by reference in its entirety.

The OSPF opaque LSAs are used to carry the BLSR ring ID and east and west directions of BLSR links so that any mismatch of ring ID or east and west directions can be automatically detected. The link state database contains BLSR information such as BLSR ring ID and node ID. Software such as OSPF object model (OM) (available from Cisco Systems, Inc. of San Jose, Calif.) may be used to calculate all of the nodes that are reachable on each BLSR ring that the local host belongs to and their hop counts from both east side and west side. This information is passed to an equipment manager and then to the BLSR software. During the calculation, OSPF object model also detects BLSR ring ID mismatch and east/west side mismatch and reports these alarms to an alarm agent. The OSPF object model contains a link state database validation, hop count and DCC (direct cable connection) number calculation for nodes on BLSRs, and shortest path tree for non-BLSR nodes. It is to be other understood that software or applications different than described herein may also be used to determine the reachable nodes, without departing from the scope of the invention.

Not all LSAs in OSPF link state database are up to date or valid. Some remain because the OSPF timer has not yet expired. OSPF object model validates the LSAs and builds its own link state database. An LSA is added to its link state database if there is a router LSA and an opaque LSA. The OSPF object model then calculates hop counts of all nodes that are on the BLSR that it is on. A shortest path tree algorithm is used to get all the nodes that are reachable from the local host.

An example of the packet format of the Opaque LSA is as follows:
    struct opq10_link {
        byte myNodeId [4];
        byte nbrNodeId [4];
        byte myIfIndex [4];
        byte nbrIfIndex [4];
        byte myEntIndex [4];
        byte nbrEntIndex [4];
        byte blsrNodeId;
        byte flags;
        byte blsrRingId [2]; }

The last 3 bits of the flags are for protection type: 0 for 2-fiber BLSR and 4 for 4-fiber BLSR. The $6^{th}$ bit is for BLSR east/west; 1 for east and 0 for west. The last field (blsrRingId) carries the ID of the ring to which this link belongs. This ring ID is unique within the autonomous network. The rest of the fields are described in U.S. patent application Ser. No. 09/478,287, filed Jan. 5, 2000, which is incorporated herein by reference in its entirety.

The following is an example of an algorithm used to detect provisioning mismatch:
    for (each BLSR link of the local node){
    find the LSA k of 1 advertised by neighbor node;
    if (k is not BLSR or k's BLSR ring ID ! = 1's BLSR ringID)
        raise BLSR ringID mismatch alarm;
    else if ((k is west and 1 is west) ||
    (k is east and 1 is east))
    raise BLSR east/west direction mismatch)

Figure 3:
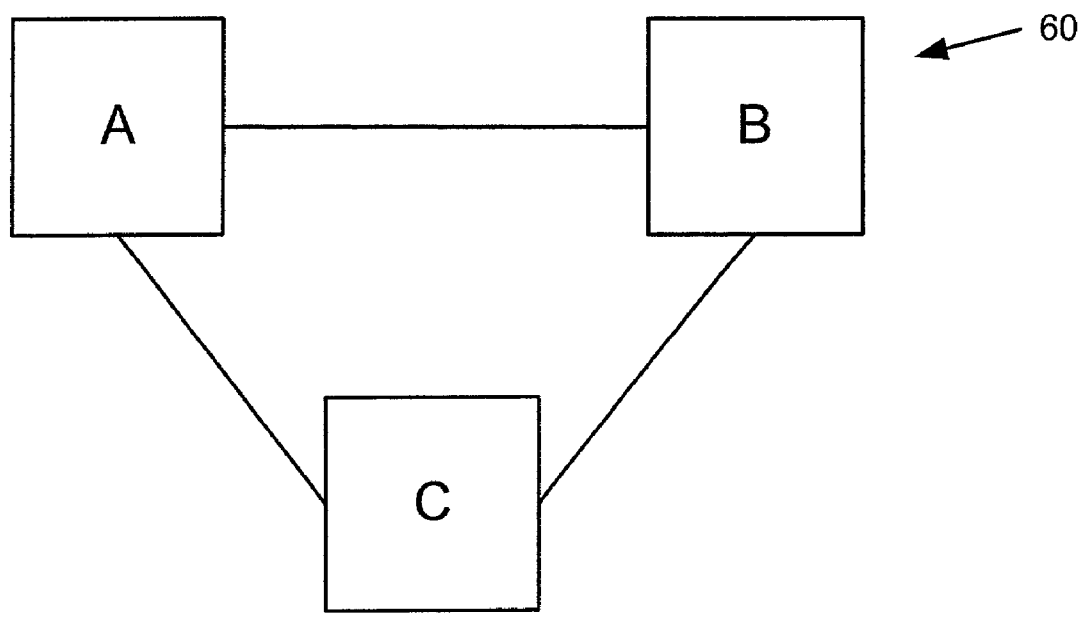
FIG. 3 is a schematic of a three node BLSR.
Figure 4:
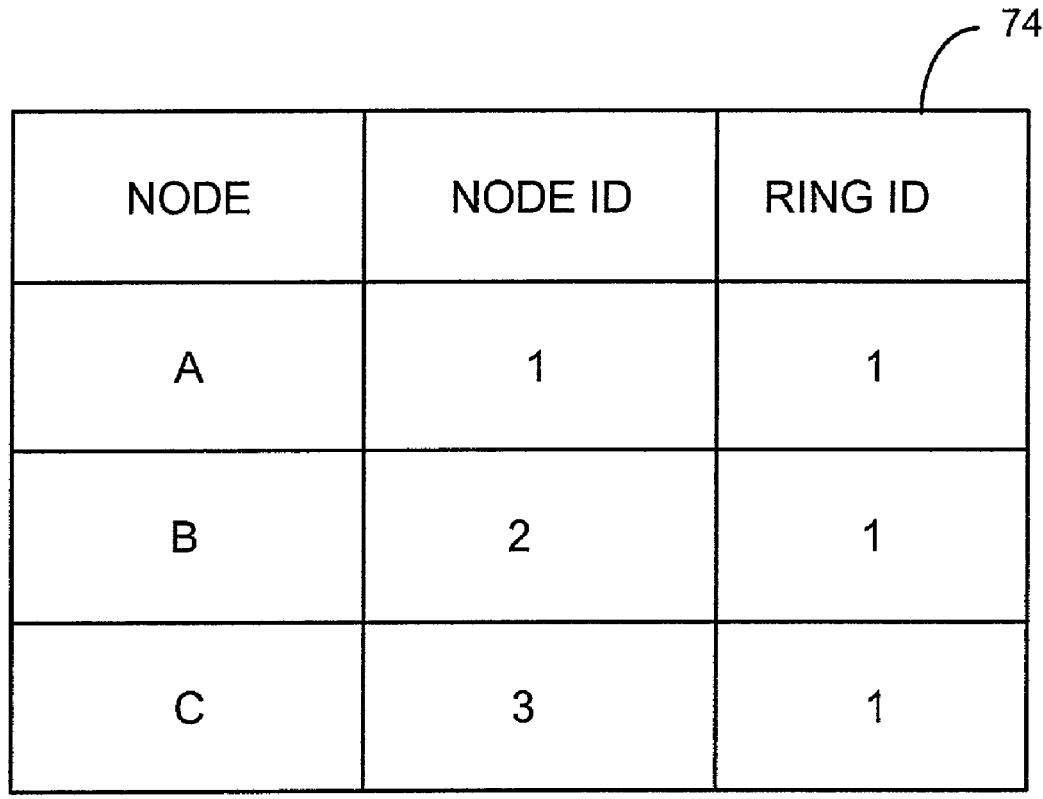
FIG. 4 is a table listing ring IDs and node IDs for the BLSR of FIG. 3.
Figure 5:
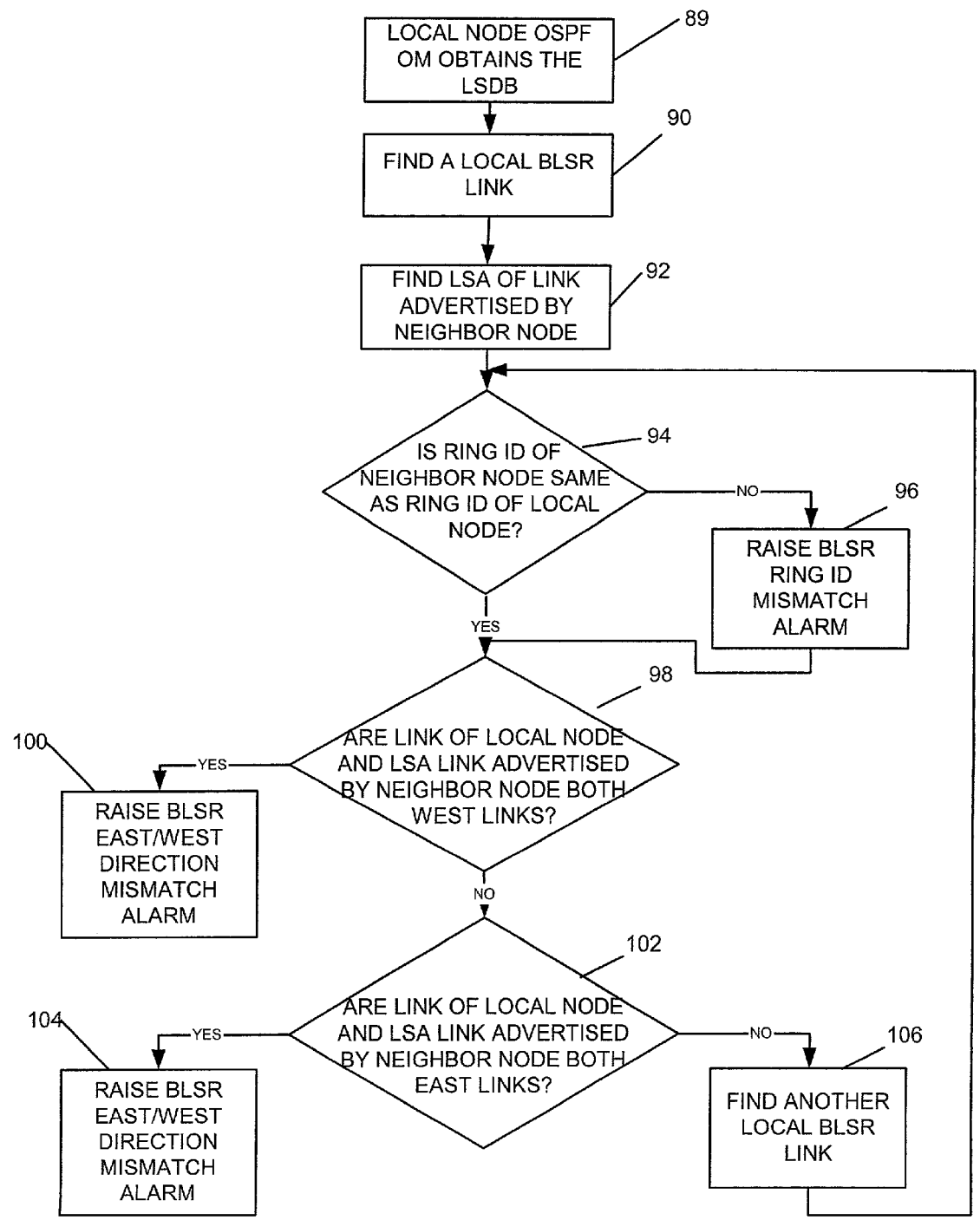
FIG. 5 is a flowchart illustrating a process of the present invention.

FIG. 5 is a flowchart illustrating the above algorithm with respect to a BLSR shown in FIG. 3. The BLSR contains three nodes A, B, and C. FIG. 4 shows a table 74 containing node IDs and ring IDs for each node of the BLSR. The local node first obtains the link state database at step 89 of FIG. 5. The local node then finds a local BLSR link and the LSA of link advertised by its neighbor nodes (steps 90 an 92). For example, if A is designated as the local node, it performs this check for neighbor nodes B and C. (According to the above algorithm, BLSR link 1 of the local node is first set equal to link A to B and the LSA k of 1 advertised by neighbor node is set equal to link B to A). If the ring ID for either of the neighbor nodes (B, C) does not match the ring ID for the local node A, a BLSR ring ID mismatch alarm is initiated (steps 94 and 96). As shown in FIG. 4, neighbor nodes B and C have the same ring ID as the local node A, thus the alarm is not raised. If one of the neighbor nodes had a different ring ID (e.g., node B had a ring ID of 2), then the alarm would be initiated.

The system next checks that links between neighbor nodes are properly identified in the link state database. As previously described, during ring provisioning, each neighbor node is designated as either an east or west node. In the example of FIG. 3, the link from node A to node B is designated as an east link and the link from node A to node B is designated as a west link. If link k (B to A) and link 1 (A to B) are both found to be west links or both found to be east links a BLSR east/west direction mismatch alarm is raised (steps 987, 100, 102, and 104). For example, if link A to B and link B to A were both identified as west links for local node A, a mismatch alarm would be initiated. The BLSR ring ID mismatch and the BLSR east/west direction mismatch alarms are both sent to a system administrator so that the problem can be resolved. This process is repeated for each BLSR link and neighbor node (step 106).

The system may also be used to detect duplicate BLSR node ID using OSPF. After the OSPF OM obtains the LSDB the node IDs of the neighbor nodes the nodes can be checked to make sure that none of the nodes have the same node ID. This can be used to check all nodes in the ring to detect any nodes that have the same node ID. The system may then register a duplicate node ID alarm if any two nodes in the ring have the same ID.

As can be observed from the foregoing, the BLSR link provisioning mismatch method and system of the present invention have many advantages. The method and system provide for automatic detection of BLSR link provisioning errors and raising of alarms to notify a system administrator. This reduces the need for manual checks of ring provisioning and allows for the identification of provisioning errors before route protection is exercised.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for automatically detecting bi-directional line switched ring link provisioning errors in a bi-directional line switched ring, the method comprising:
   receiving from each neighbor node, an opaque link state advertisement containing a bi-directional line switched ring ID and link information of the neighbor node sending the advertisement at a local node of the ring, each of the neighbor nodes and the local node having said bi-directional line switched ring ID assigned thereto and associated with a bi-directional line switched ring;
   checking the ring IDs of each of the neighbor nodes to determine if each of said ring IDs of the neighbor nodes match said bi-directional line switched ring ID assigned to the local node; and
   raising a ring ID mismatch alarm if the ring IDs of the local node and neighbor nodes do not match to identify a bi-directional line switched ring link provisioning error in said bi-directional line switched ring.

2. The method of claim 1 further comprising checking the ring ID of all nodes in the ring and raising the ring ID mismatch alarm if any of the ring IDs do not match.

3. The method of claim 1 further comprising checking links between each of the neighbor nodes and the local node and raising a direction mismatch alarm if more than one neighbor node is identified with an east link or more than one neighbor node is identified with a west link.

4. The method of claim 3 further comprising repeating the east and west link checks for each node in the ring.

5. The method of claim 1 wherein receiving an opaque LSA comprises receiving a route table from OSPF (Open Shortest Path First).

6. The method of claim 5 wherein the route table is received at a BLSR (bi-directional line switched ring) state machine.

7. The method of claim 1 further comprising receiving a link state database.

8. The method of claim 1 wherein each of said nodes in said ring have a unique node ID associated therewith.

9. The method of claim 8 further comprising checking the node IDs of the neighbor nodes to determine if any of the nodes have the same node ID and raising a duplicate node ID alarm if any two nodes in the ring have the same ID.

10. A system for automatically detecting bi-directional line switched ring link provisioning errors in a bi-directional line switched ring, the system comprising:
   a processor operable to receive from each neighbor node an opaque link state advertisement containing a bi-directional line switched ring ID and link information of the neighbor node sending the advertisement at a local node of the ring, check the ring ID of each of the neighbor nodes to determine if each of said ring IDs of the neighbor nodes match the bi-directional line switched ring ID of the local node, and raise a ring ID mismatch alarm if the ring IDs of the local node and neighbor nodes do not match to identify a bi-directional line switched ring link provisioning error in said bi-directional line switched ring, each of the neighbor nodes and the local node having said bi-directional line switched ring ID assigned thereto and associated with a bi-directional line switched ring; and
   memory configured to at least temporarily store the link state advertisement.

11. The system of claim 10 wherein the processor is configured to receive link state information from OSPF (Open Shortest Path First).

12. The system of claim 10 wherein the processor is configured to links between each of the neighbor nodes and the local node and raises a direction mismatch alarm if more than one neighbor node is identified with an east link or more than one neighbor node is identified with a west link.

13. The system of claim 10 wherein the opaque link state advertisement further comprises east and west directions of links.

14. The system of claim 12 wherein each of the nodes in the ring comprises a unique node ID and the processor is configured to check the node IDs of the neighbor nodes to determine if any of the nodes have the same node ID and raise a duplicate node ID alarm if any two nodes in the ring have the same node ID.

15. A computer-readable storage medium encoded with a computer program for automatically detecting bi-directional line switched ring link provisioning errors in a bi-directional line switched ring, the computer program comprising:
   computer code that receives from each neighbor node an opaque link state advertisement containing bi-directional line switched ring ID and link information of the neighbor node that sent the advertisement at a local node of the ring, each of the neighbor nodes and the local node having a bi-directional line switched ring ID assigned thereto and associated with a bi-directional line switched ring;
   computer code that checks the ring IDs of each of the neighbor nodes to determine if each of said ring IDs of the neighbor nodes match said bi-directional line switched ring ID assigned to the local node; and
   computer code that raises a ring ID mismatch alarm if the ring IDs of the local node and neighbor nodes do not match to identify a bi-directional line switched ring link provisioning error in said bi-directional line switched ring.

16. The computer-readable storage medium of claim 15 wherein the computer readable medium is selected from the group consisting of CD-ROM, floppy disk, zip disk, tape, flash memory, system memory, and hard drive.

17. The computer-readable storage medium of claim 15 further comprising code that receives OSPF (Open Shortest Path First) link state databases.

18. The computer-readable storage medium of claim 15 further comprising code that checks the ring ID of all nodes in the ring and raises the ring ID mismatch alarm if any of the ring IDs do not match.

19. The computer-readable storage medium of claim 15 further comprising code that checks links between each of the neighbor nodes and the local node and raises a direction mismatch alarm if more than one neighbor node is identified with an east link or more than one neighbor node is identified with a west link.

20. The computer-readable storage medium of claim 19 further comprising code that repeats the east and west link checks for each node in the ring.

* * * * *